(12) United States Patent
Kulkarni et al.

(10) Patent No.: US 10,527,118 B2
(45) Date of Patent: Jan. 7, 2020

(54) DISC BRAKE

(71) Applicant: Meritor Heavy Vehicle Braking Systems (UK) Limited, Cwmbran, Gwent (GB)

(72) Inventors: Sanjeev Kulkarni, Gwent (GB); Martin Taylor, Gwent (GB)

(73) Assignee: Meritor Heavy Vehicle Braking Systems (UK) Limited, Cwmbran, Gwent (GB)

(*) Notice: Subject to any disclaimer, the term of this patent is extended or adjusted under 35 U.S.C. 154(b) by 22 days.

(21) Appl. No.: 16/055,469

(22) Filed: Aug. 6, 2018

(65) Prior Publication Data

US 2019/0063530 A1 Feb. 28, 2019

(30) Foreign Application Priority Data

Aug. 31, 2017 (EP) .................................. 17188746

(51) Int. Cl.

| F16D 65/46 | (2006.01) |
|---|---|
| F16D 65/42 | (2006.01) |
| F16D 65/52 | (2006.01) |
| F16D 55/227 | (2006.01) |
| F16D 65/18 | (2006.01) |
| F16D 65/097 | (2006.01) |
| F16D 125/06 | (2012.01) |

(52) U.S. Cl.
CPC .......... *F16D 65/42* (2013.01); *F16D 55/227* (2013.01); *F16D 65/0972* (2013.01); *F16D 65/183* (2013.01); *F16D 65/52* (2013.01); *F16D 2125/06* (2013.01)

(58) Field of Classification Search
CPC .......... F16D 65/42; F16D 65/46; F16D 65/52; F16D 65/183
USPC ...... 188/71.1–71.9, 72.1–72.9, 79.57, 196 D, 188/196 BA
See application file for complete search history.

(56) References Cited

U.S. PATENT DOCUMENTS

| 3,467,228 A | * | 9/1969 | Knights ................. F16D 55/224 188/196 R |
| 3,901,357 A | * | 8/1975 | Reitz ........................ F16D 65/60 188/79.55 |
| 4,499,976 A | * | 2/1985 | Weber ................... F16D 65/567 188/196 D |

(Continued)

FOREIGN PATENT DOCUMENTS

| EP | 0730107 A2 | 9/1996 |
| EP | 2602506 A1 | 6/2013 |
| EP | 3179127 A1 | 6/2017 |

OTHER PUBLICATIONS

European Patent Office, Extended European Search Report for Application No. EP17188746.6-1012, dated Feb. 15, 2018, 7 pages.

*Primary Examiner* — Christopher P Schwartz
(74) *Attorney, Agent, or Firm* — Brooks Kushman P.C.

(57) ABSTRACT

A disc brake that includes a housing, a piston, and a manual adjuster apparatus. The piston may be mounted within the housing and may have a rotatable portion defining an axis of rotation. The manual adjuster apparatus may be drivingly connected to the rotatable portion and may have a first element and a universal joint drivingly connecting the first element to the rotatable portion such that the first element extends away from the rotatable portion at an angle that is oblique to the axis of rotation.

19 Claims, 5 Drawing Sheets

(56) References Cited

U.S. PATENT DOCUMENTS

| | | | | |
|---|---|---|---|---|
| 4,503,947 A | * | 3/1985 | Heidmann | F16D 65/18 |
| | | | | 188/370 |
| 4,645,038 A | * | 2/1987 | Meynier | F16D 55/2262 |
| | | | | 188/196 BA |
| 2013/0140114 A1 | * | 6/2013 | Roberts | F16D 65/40 |
| | | | | 188/71.8 |
| 2015/0362033 A1 | * | 12/2015 | Yasui | F16D 65/18 |
| | | | | 188/72.8 |
| 2016/0215835 A1 | | 7/2016 | Cleary et al. | |

\* cited by examiner

DISC BRAKE

TECHNICAL FIELD

The present invention relates to a disc brake. More particularly, but not exclusively, the present invention relates to an air actuated disc brake including a manual adjuster apparatus for adjusting the position of a brake pad relative to a brake disc.

BACKGROUND

Air actuated disc brake for heavy vehicles such as trucks and buses are typically provided with a mechanism to manually rewind the adjuster mechanism that maintains the correct pad to rotor clearance as friction material wears. The mechanism is required so that unworn pads can be fitted into the space previously occupied by thinner worn pads. The mechanism may also be required to advance pads towards the rotor in certain circumstances, typically to take up excess clearance when new, unworn pads are fitted.

Disc brakes of this type are fitted to a wide variety of vehicles, often with different available space envelopes into which the caliper, and in particular the air actuator that is mounted to the caliper, can be fitted. As a result, the air actuator may be mounted at a variety of angles with respect to the caliper.

When the air actuator is mounted at certain angles, this may restrict access to the part of the manual adjuster apparatus where a technician will be required to attach a spanner, wrench or the like to rewind adjuster mechanism. This can be inconvenient to the technician, and/or may require a proprietary tool to be used for access.

This issue may be particularly acute for disc brakes in which the manual adjuster apparatus is centrally mounted, as may be the case for single piston brakes where a shaft of the manual adjuster system is co-axial with the piston and extends inboard through the housing of the brake caliper to be accessible on the inboard face of the housing at a location where access may be prevented by a lowermost part of the air actuator. An example of and air disc brake of this configuration is EP0730107 (Perrot Bremsen).

The present invention seeks to overcome, or at least mitigate, the problems of the prior art.

SUMMARY

According to an aspect of the invention there is provided a disc brake for a heavy commercial vehicle, the disc brake comprising: a housing; a piston mounted within the housing for applying an actuating force to a brake pad, the piston having a rotatable portion to adjust the running clearance between a brake disc and the brake pad and the rotatable portion defining an axis of rotation; a manual adjuster apparatus drivingly connected to the rotatable portion; wherein the manual adjuster apparatus comprises a first element and a universal joint drivingly connecting the first element to the rotatable portion such that the first element extends away from the rotatable portion at an angle that is oblique to the axis of rotation.

This arrangement, with the first element (adjuster shaft) of the manual adjuster apparatus extending away from the housing of the brake assembly at an angle that is oblique to the axis of the piston, allows an operator easier access to the manual rewind apparatus when inspecting or replacing brake pads or other components of a disc brake.

The manual adjuster apparatus may further comprise a second element, wherein the second element drivingly connects the universal joint to the rotatable portion.

Advantageously, this arrangement enables the manual adjuster apparatus to mesh efficiently with the piston.

The first element optionally has a head remote from the universal joint, the head being accessible from an exterior of the housing to apply torque to the apparatus.

This arrangement enables a technician to easily access the manual adjuster apparatus to retract or extend the piston.

The head may be accessible from an inboard face of the exterior.

The inboard face advantageously allows access to the head even if a wheel associated with the disc brake remains in place, but equally is a location where access to the head would normally be impeded by the air actuator.

The first element may extend at a radially inward angle.

A radially inward angle assists in avoiding the location of an air actuator if the air actuator is mounted on an inboard face of the caliper housing.

A wall of the housing may be a bearing for the first element and the first element is journaled thereto.

Using the wall as a bearing provides a convenient way for the first element to be supported.

The bearing is optionally arranged to maintain the angle.

Using the wall to provide the angular support further enhances the convenience of the support arrangement.

An interface between the first element and a wall of the housing is optionally arranged to restrict movement of the first element in at least a first axial direction.

Using the wall to provide an axial stop further enhances the convenience of the support arrangement.

The second element may be in substantially parallel alignment with an axis of the rotatable portion.

The second element may be located at least partially within the piston.

Advantageously this provides a compact arrangement.

The second element is optionally in direct driving engagement with the rotatable portion.

The first element is optionally a rotatable shaft.

The oblique angle is optionally between 1 and 60 degrees from the axis of the piston, preferably between 5 and 45 degrees from the axis of the piston.

The universal joint may comprise a ball head and sleeve arrangement.

Advantageously, a ball head and sleeve is a low cost and reliable form of universal joint that has limited moving parts.

The universal joint may comprise a coiled flexible joint.

Advantageously, a flexible coiled joint is a low cost and reliable form of universal joint that has limited moving parts.

An axis of the manual adjuster apparatus may be on substantially the same radial plane as a line of action of a push rod of an actuator of the disc brake.

BRIEF DESCRIPTION OF THE DRAWINGS

Embodiments of the invention will now be described by way of example only with reference to the accompanying drawings, in which:

FIG. 2A is an enlarged view of the portion labelled Detail A of FIG. 2;

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Actuation

Figure 1:
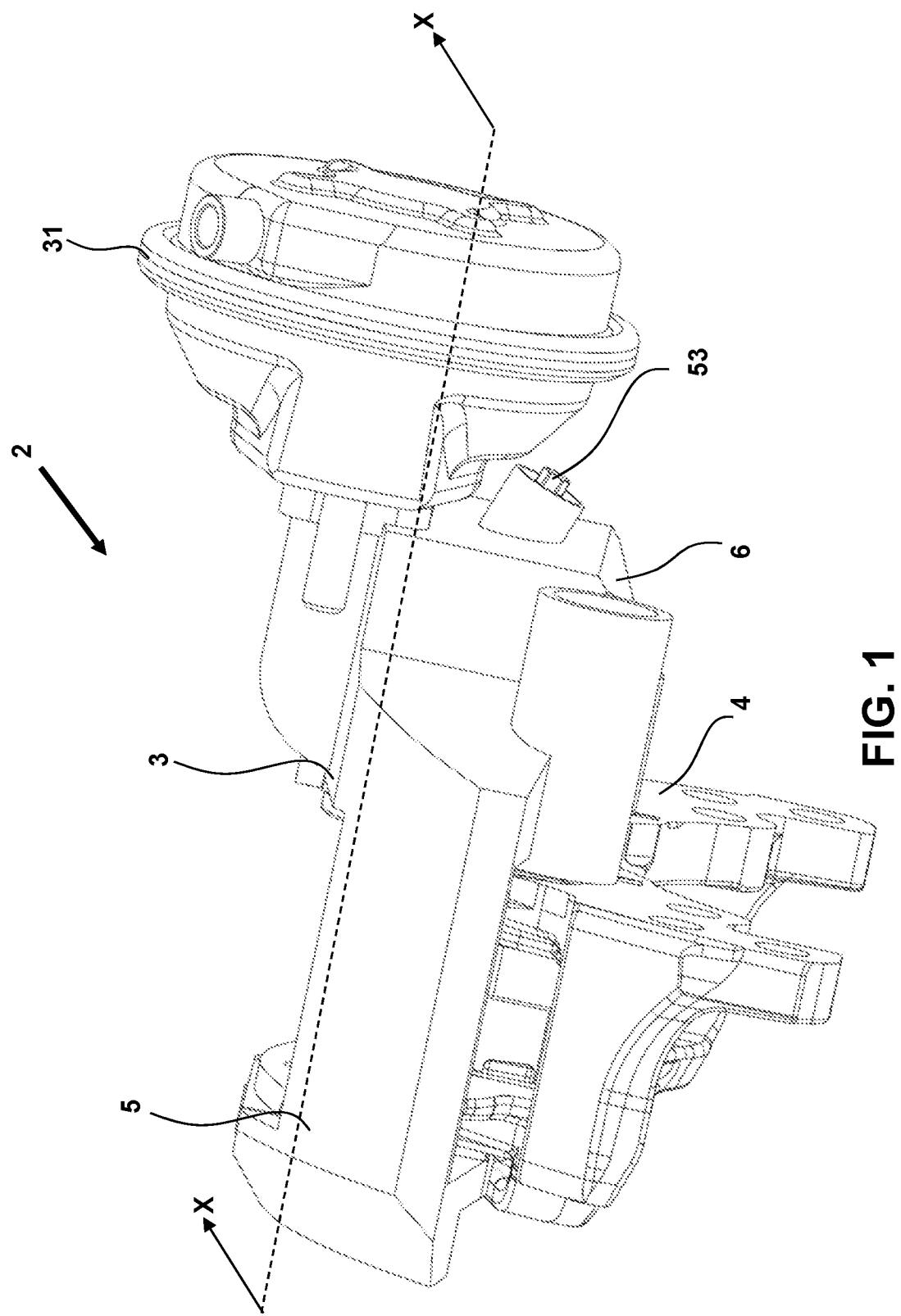
FIG. 1 is an isometric view of a disc brake according to the present invention.
Figure 2:
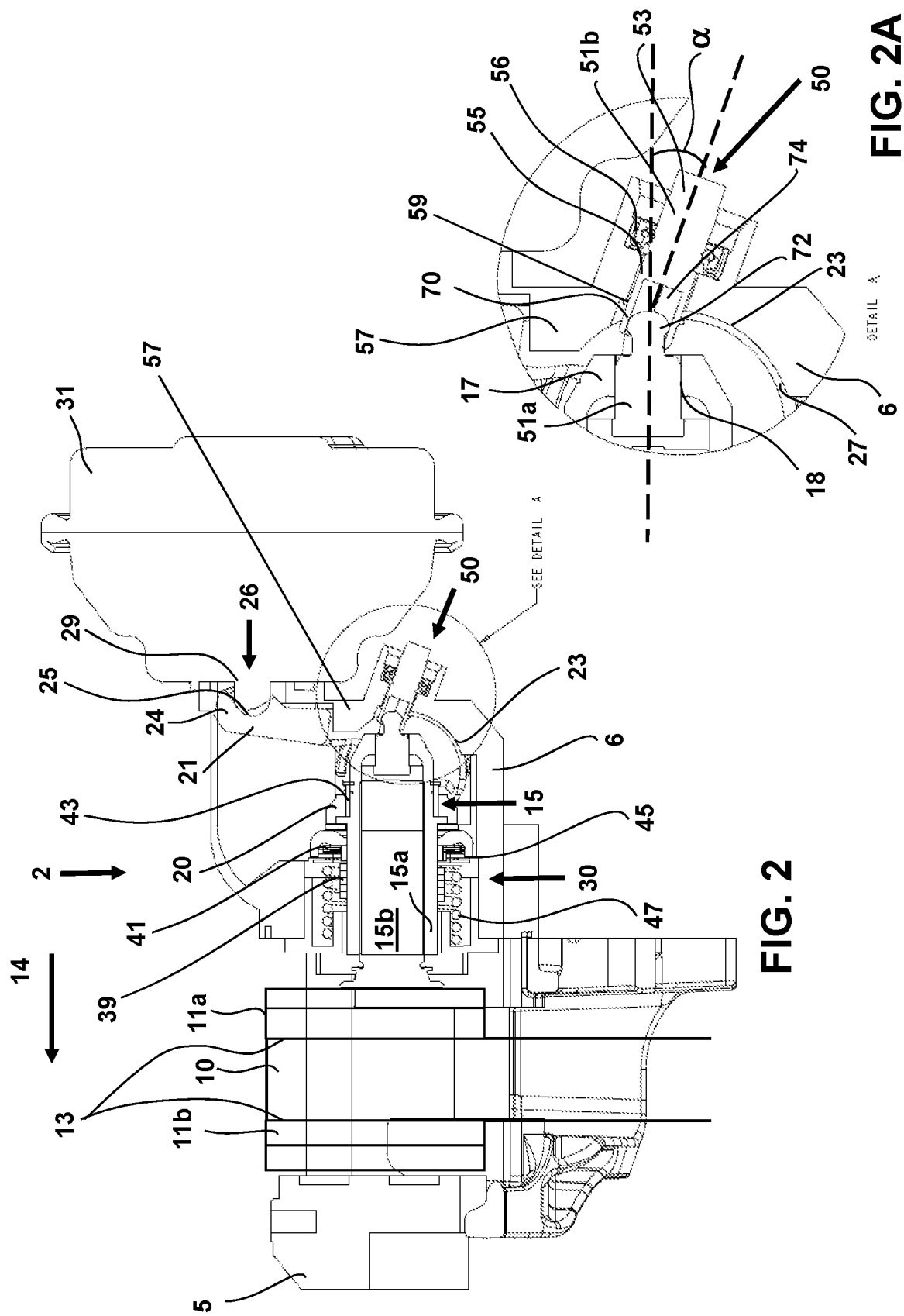
FIG. 2 is a vertical cross section through an inboard-outboard vertical plane X-X positioned through a circumferential midpoint of the disc brake of FIG. 1.
Figure 3:
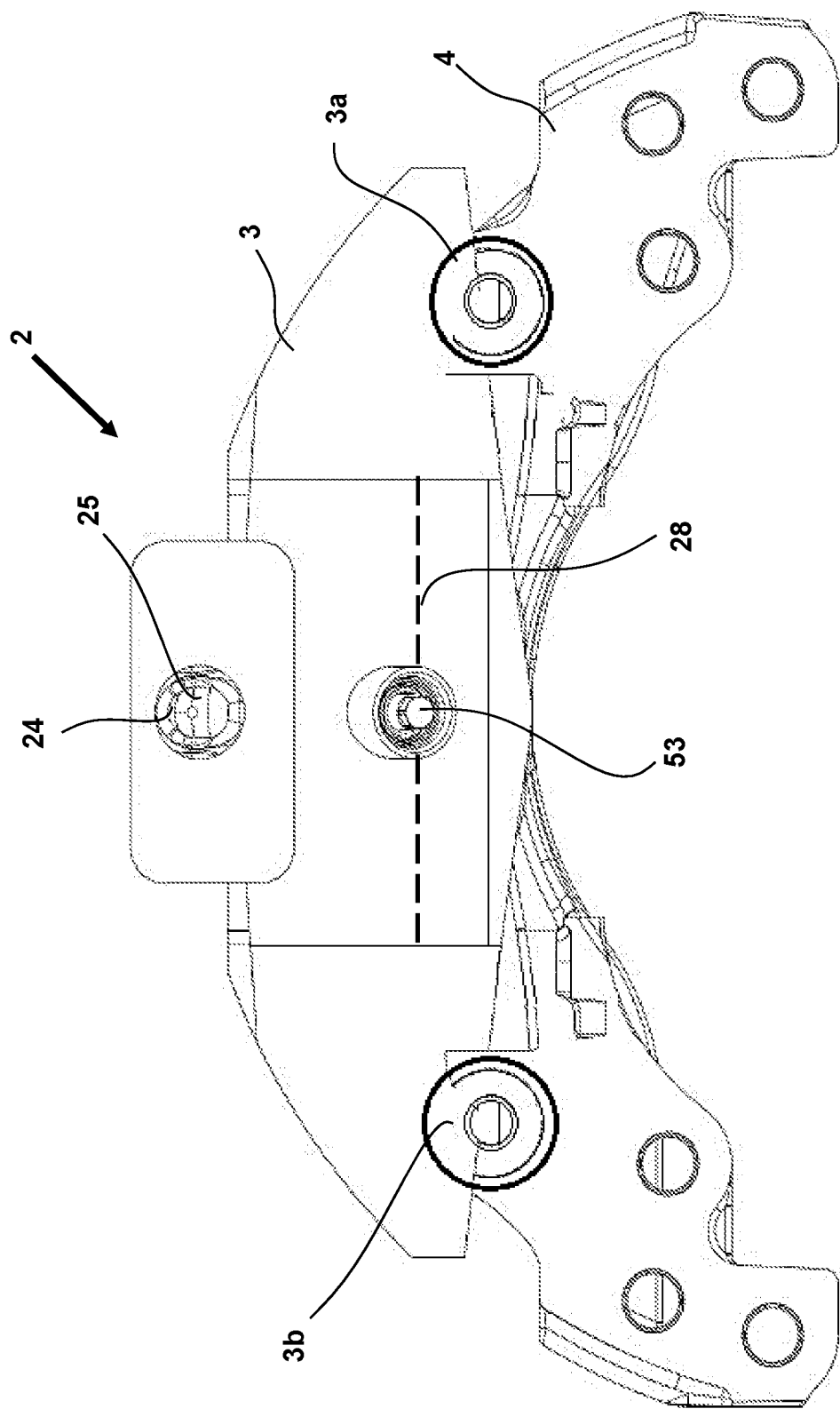
FIG. 3 is a view of the inboard face of the disc brake of FIG. 1.

FIGS. 1, 2 and 3 illustrate a disc brake 2. The disc brake incorporates an actuating mechanism comprising a single piston suitable for a commercial vehicle. This type of brake is particularly, but not exclusively, suitable for lighter duty heavy vehicles, for example smaller trucks, or a trailer of a tractor-trailer combination.

Various orientations of the disc brake are described. In particular, the directions inboard and outboard refer to the typical orientation of the disc brake when fitted to a vehicle. In this orientation the brake pad closest to the center of the vehicle is the pad directly actuated by an actuation mechanism and being the inboard pad, and the outboard pad being one mounted to a bridge portion of the caliper. Thus, inboard can be equated with an actuating side of the disc brake, and outboard with a reaction side. The terms radial, circumferential, tangential and chordal describe orientations with respect to the brake rotor. The terms vertical and horizontal describe orientations with the disc brake mounted uppermost on an axle, whereas it will be appreciated that in use such a disc brake may adopt any axle orientation depending upon packaging requirements of the vehicle.

The disc brake 2 comprises a caliper 3 having a housing 6 to accommodate the actuation mechanism and which is slideably mounted on a carrier 4 for movement in an inboard-outboard direction.

As can be seen from the view in FIG. 3, the caliper 3 can slide on the carrier 4, by way of first and second guide pins 3a, 3b.

An inboard brake pad 11a comprises a layer of friction material and is arranged so that the friction material faces a brake rotor 10 (also known as a brake disc). The inboard brake pad 11a is mounted to a brake pad support arrangement in the form of a recess of the carrier 4. The inboard brake pad 11a is moveable in the direction of arrow 14 (see FIG. 2) against the brake rotor 10. The rotor 10 rotates about an axis X-X.

An outboard brake pad 11b, also with a layer of friction material, is also provided. The outboard brake pad 11b is mounted to a further brake support arrangement in the form of a further recess in the carrier outboard of the rotor 10.

Suitable means are provided to urge an outboard brake pad 11b against the opposite side of the rotor 10. In this embodiment, such means comprises a bridge 5 arranged so as to straddle the rotor 10 and to transmit the reaction force from an inboard operating shaft 21 to the outboard brake pad 11b. In this embodiment the housing 6 and bridge 5 are manufactured as a single monolithic casting, but in other embodiments, the bridge may be bolted or otherwise secured to the housing.

With reference to the cross-section of FIG. 2, the inboard actuation mechanism comprises a single brake piston 15, moveable in the direction of arrow 14 (i.e., inboard-outboard) relative to the rotor 10.

In order to urge the piston assembly in the direction of arrow 14, the operating shaft 21 is pivoted about curved surfaces 23 (one visible) which are located along a transverse axis 28 in corresponding bearing surfaces 27 provided in the inboard wall of the housing 6, each bearing surface 27 being curved to accept the curved surface 23. Concave surfaces of the operating shaft 21 are located opposite the curved surfaces 23 to receive rollers. The rollers define an axis, which is parallel to and offset from the transverse axis 28. The rollers engage a yoke 20, which in turn is arranged to actuate the piston 15.

The operating shaft 21 further comprises a lever 24 having a pocket 25 adapted to receive an output push rod 29 of a brake actuator 31 (e.g., an air chamber). The lever 24 is, in this embodiment, shaped as an inverted "U" and the line of action of the brake actuator (from pocket 25) is substantially over the line of action of the piston 15.

The yoke 20 has a through bore 43 extending axially through its center to receive the piston 15.

Application of a force in the direction of arrow 26 causes pivoting movement of the operating shaft 21 about the curved surfaces. The offset axes of the operating shaft 21 and rollers cause the yoke 20 to move in the direction of the piston 15, contacting the piston 15 and causing the piston 15 to urge the friction material 13 of the inboard brake pad 11a directly against the rotor 10. A reaction force from the operating shaft 21 is transmitted to the bearing surface 27 of the caliper 3 via the surfaces 23 and is then transmitted to the outboard brake pad 11b via the bridge 5, with the friction material 13 of the outboard brake pad 11b being urged against the rotor 10, such that the inboard and outboard brake pads 11a and 11b clamp the rotor 10 and effect braking through a frictional brake force.

In other embodiments, such as that described below, the arrangement may be reversed with the rollers being in contact with the housing 6, and the curved surface 23 being located in contact with the yoke 20.

Wear Adjustment

A wear adjuster mechanism 30 to maintain a desired running clearance between the rotor 10 and inboard and outboard brake pads 11a, 11b is described below.

Generally, the operating shaft 21 is connected to a torque limiting clutch, which is a friction clutch 41 (comprising interleaved input and output clutch plates) in this embodiment and a one-way clutch, which is a wrap spring 39 in this embodiment, to transfer any rotation of the operating shaft beyond a predetermined amount to the piston up to a predetermined level of torque.

Alternatively, a ball and ramp arrangement could be used for the torque limiting clutch instead of a friction clutch, as is known in the art. Alternatives to a wrap spring may also be used as the one-way clutch.

The piston 15 comprises a rotatable portion and a non-rotatable portion. In this embodiment the rotatable portion is an outer piston 15a having an internal female thread, and the non-rotatable portion is an inner piston 15b, having a complimentary external male thread. Therefore, in this embodiment the inner piston 15b is located within the outer piston 15a. In this embodiment the wrap spring 39 directly drives the outer piston 15a. The inner piston 15b is restrained from rotation, e.g., by being keyed to the inboard brake pad 11a.

In alternative embodiments, the rotatable portion could be the inner piston 15b and the non-rotatable portion could be the outer portion 15a.

The components above, that are located between the operating shaft and inner and outer piston, define a transmission path of the wear adjuster mechanism 30 and take drive from the pivoting of the operating shaft.

The outer piston 15a is configured to rotate during an adjustment operation, to cause the piston 15 to advance in the direction of the inboard brake pad 11a.

The wear adjuster mechanism 30 additionally comprises a pressure plate 45 located outboard and engaging the friction clutch 41. An outboard face of the pressure plate 45 is acted on by a compression spring 47, the compression spring 47 being arranged concentrically with the piston, and generates the required amount of friction to control the torque at which the friction clutch 41 slips. In this embodiment the compression spring 47 also acts as a return spring to return the piston 15 and operating shaft 21 to their brakes-off positions when a braking operation is complete and the output push rod 29 is retracted.

In order to maintain a desired running clearance between the brake pads and rotor, the wear adjuster mechanism 30 is required to periodically advance the inboard brake pad 11a towards the rotor 10 to account for the loss of friction material 13, and to a lesser extent, loss of material from the face of the rotor 10, due to wear.

A predetermined amount of play or backlash is provided in the transmission path. In a normal braking operation in which the running clearance is within the desired parameters, as the operating shaft 21 pivots, the play in the system means that no adjustment will occur.

If the running clearance is however greater than the desired range, the aforesaid play is taken up. Whilst there is excess running clearance to be taken up, this rotation is transmitted via friction clutch 41 to the wrap spring 39, causing the wrap spring 39 to rotate around the outer piston 15a in a direction which causes the wrap spring 39 to tighten, transmitting the rotation from a drive drum to a driven drum. In other embodiments the position of the torque limiting clutch and one-way clutch in the adjustment transmission path may be reversed.

Since the inner piston 15b is restrained from rotation by the engagement with the inboard brake pad 11a, this causes a lengthening of the piston 15 to reduce the running clearance. At the point at which the friction material 13 comes into full contact with the rotor 10, the torque passing through the adjustment mechanism increases. When this torque increases to a level that is higher than the maximum torque value of the friction clutch 41, the friction clutch 41 slips and further extension of the piston 15 is prevented. Once the braking operation ceases, the compression spring 47 acts to urge the operating shaft 21 back to its rest position. A corresponding retraction of the inner piston 15b is prevented since the wrap spring 39 relaxes and does not transmit a reverse rotation to the outer piston 15a.

Manual Adjuster Apparatus

Once the friction material 13 has worn to its design limit, it is necessary for the inboard and outboard brake pads 11a and 11b to be replaced. In order to accommodate the extra depths of unworn new pads as compared to worn old pads, it is necessary for the piston 15 to be rewound back to its retracted position.

To this end, a manual adjuster apparatus 50 incorporating a first element 51b and a second element 51a is provided. The first element, at least, is a shaft. The second element 51a and first element 51b are arranged end-to-end. A universal joint 70 drivingly connects the second element and the first element, and the first element 51b extends away from the second element 51a at an angle that is oblique to the axis of the second element.

The first element 51b has a hex head 53 or other suitable interface provided at the outer (user accessible) longitudinal end thereof. The hex head 53 has a cover, which is located over the hex head 53. In this embodiment, the cover is a rubber cap. The cover can be removed by a user when access to the hex head 53 is required. A spanner, wrench or other suitable tool may be attached to the hex head 53 to effect the rewinding operation.

The first element extends through a bore 55 provided in an inboard wall 57 of the caliper housing 6 so that the hex head 53 is accessible from an inboard face of the exterior of the caliper housing 6.

It can be seen that the first element 51b extends at a radially inward angle $\alpha$, i.e., it is angled towards the rotational axis X-X of the rotor 10. As can be seen in FIG. 2 a radially inward angle directs the hex head 53 of the first element 51b away from the brake actuator 31, when, as depicted it is mounted on the inboard wall 57 of the caliper housing 6. As a result, more space is available for a tool to be attached to the hex head 53 to rotate the manual adjuster apparatus 50, as compared to a shaft that extends inboard in alignment with the axis of the piston 15.

The oblique angle $\alpha$ between the first element 51b and second element 51a may be any angle that is practically achievable by the form of universal joint that is used. For example, it may be between 1 and 60 degrees from the axis of the piston 15, but more typically between 5 and 45 degrees. In alternative embodiments, the angle may be in a circumferential direction, or a combination of circumferential and radial. The radial angle may be radially outwards.

In this embodiment, the inboard wall 57 of the caliper housing 6 also acts as a plain bearing for the first element 51b such that a portion of the first element is a journal for the bearing, and the wall assists in maintaining the desired angle of the first element 51b.

In addition, an interface between the first element 51b and the inboard wall 57 of the housing is arranged to restrict movement of the first element axially outboard. In this embodiment a collar 59 is provided around the first element that abuts the outboard face of the inboard wall 57 to restrict outboard movement of the first element. Alternatively, other suitable forms such as snap rings may be used as a stop and may be provided on the inboard face to prevent outboard movement too.

In particular, the interface, to restrict movement inboard, may be utilized to assist installation of the manual adjuster shaft, e.g., if the universal joint 70 is to be attached to the first element 51b once the first element has been inserted through the inboard wall 57.

In this embodiment, the second element 51a is in substantially parallel alignment with an axis of the outer piston 15a of the piston 15. This enables the second element 51a to drivingly mesh more easily with the outer piston 15a.

In this embodiment, the second element 51a is also coaxially aligned with the outer piston 15a and is additionally located partially within the piston 15. Specifically, the outer piston 15a has a bore 18 in an inboard end wall 17 thereof that has a non-circular profile. The second element 51a has a corresponding external profile such that direct driving engagement is provided, but relative axial movement is permitted (e.g., during brake application when the piston moves outboard). As in this embodiment, the outboard end of the second element 51a may be enlarged to restrict relative axial motion.

The universal joint 70 depicted in FIGS. 2 and 2A comprises a ball head 72 and sleeve 74 arrangement. The ball head 72 and sleeve 74 have a non-circular profile, for example a hex profile. The shape of the ball head and adjacent thinned portion of the element permit a degree of articulation within the sleeve, but the hex head nevertheless causes torque to be transmitted between the two components. In other embodiments the location of sleeve and head may be reversed. As the usage of the manual adjuster apparatus is limited over the life of a disc brake, the robust nature of this arrangement is advantageous, and wear of the contacting surfaces is minimal.

In alternative embodiments, alternative forms of universal joint may be used, such as a coiled flexible joint, Hookes joint or a constant velocity joint.

Located outboard of the cover, is a sealing collar 56. The sealing collar 56 is generally annular and is configured to locate on the first element 51b adjacent the cover. The manual adjuster apparatus 50 is configured such that it can freely rotate within the sealing collar 56, e.g., by use of one or more of suitable lubrication, coatings such as PTFE, or by the collar incorporating a lip seal that minimizes the contact areas between the collar and shaft. The base of the sealing member engages with the sealing collar 56 to substantially seal lubricant within the housing 6 of the brake and help prevent foreign material from contaminating the housing 6 of the brake.

Variants of Manual Adjuster Apparatus

Figure 4:
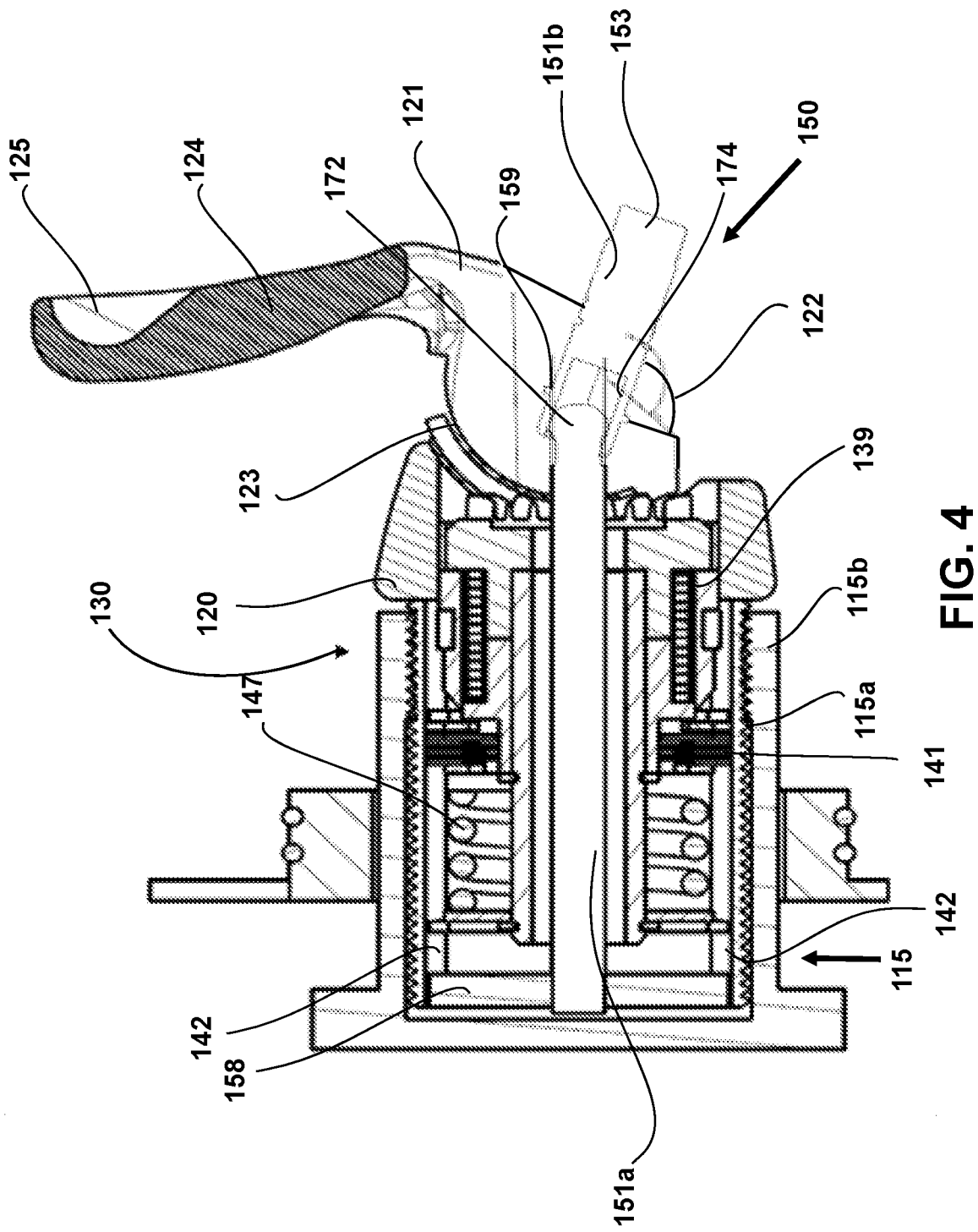
FIG. 4 is a vertical cross-section through an adjuster mechanism of a disc brake according to another embodiment of the present invention.

FIG. 4 illustrates an adjuster mechanism incorporating a manual adjuster apparatus of a disc brake according to a second embodiment of the present invention. Like components are denoted by like numerals but with the addition of the prefix "1".

The wear adjuster mechanism 130 of this embodiment is mounted in a caliper housing similar to that of the first embodiment but the mechanism differs from that of the first embodiment in that the rotatable portion 115a of the piston 115 is concentrically within the non-rotatable portion 115b. In other words, the rotatable portion 115a is an inner piston and the non-rotatable portion 115b is an outer piston.

The rotatable portion 115a is hollow and, consequently, the wear adjuster mechanism 130 of the friction clutch 141 and wrap spring 139 or one-way clutch are mounted within the piston 115 and the output plates of the friction clutch drive the inner surface of the rotatable portion 115a. In addition, in this embodiment the orientation of the curved surface 123 of the operating shaft 121 and rollers 122 is reversed. Therefore, in this embodiment the curved surface 123 engage a yoke 120. The operating shaft 121 comprises a lever 124 having a pocket 125 adapted to receive an output push rod. Furthermore, compression springs 147 and collar 159 act in a similar way to the compression springs 47 and collar 59 of the first embodiment described herein. The joint also comprises a ball head 172 and sleeve 174 arrangement.

The manual adjuster apparatus 150 is mounted concentrically and radially inwardly with respect to the components of the wear adjuster mechanism 130 and the second element 151a extends through the radial center of the wear adjuster mechanism. At the outboard end longitudinally opposite the hex head 153, a piston engaging end piece 158 is mounted on the second element 151a and drivingly engages the rotatable portion 115a via channels 142 of the rotatable portion 115a.

In use during manual adjustment therefore, a user rotates the hex head 153 to rotate a first element 151b of the manual adjuster apparatus 150. Due to the engagement between the end piece 158 and the channels 142 of the rotatable portion 115a, the rotatable portion 115a is caused to rotate, rewinding the piston 115 back to its original retracted position.

Figure 5A:
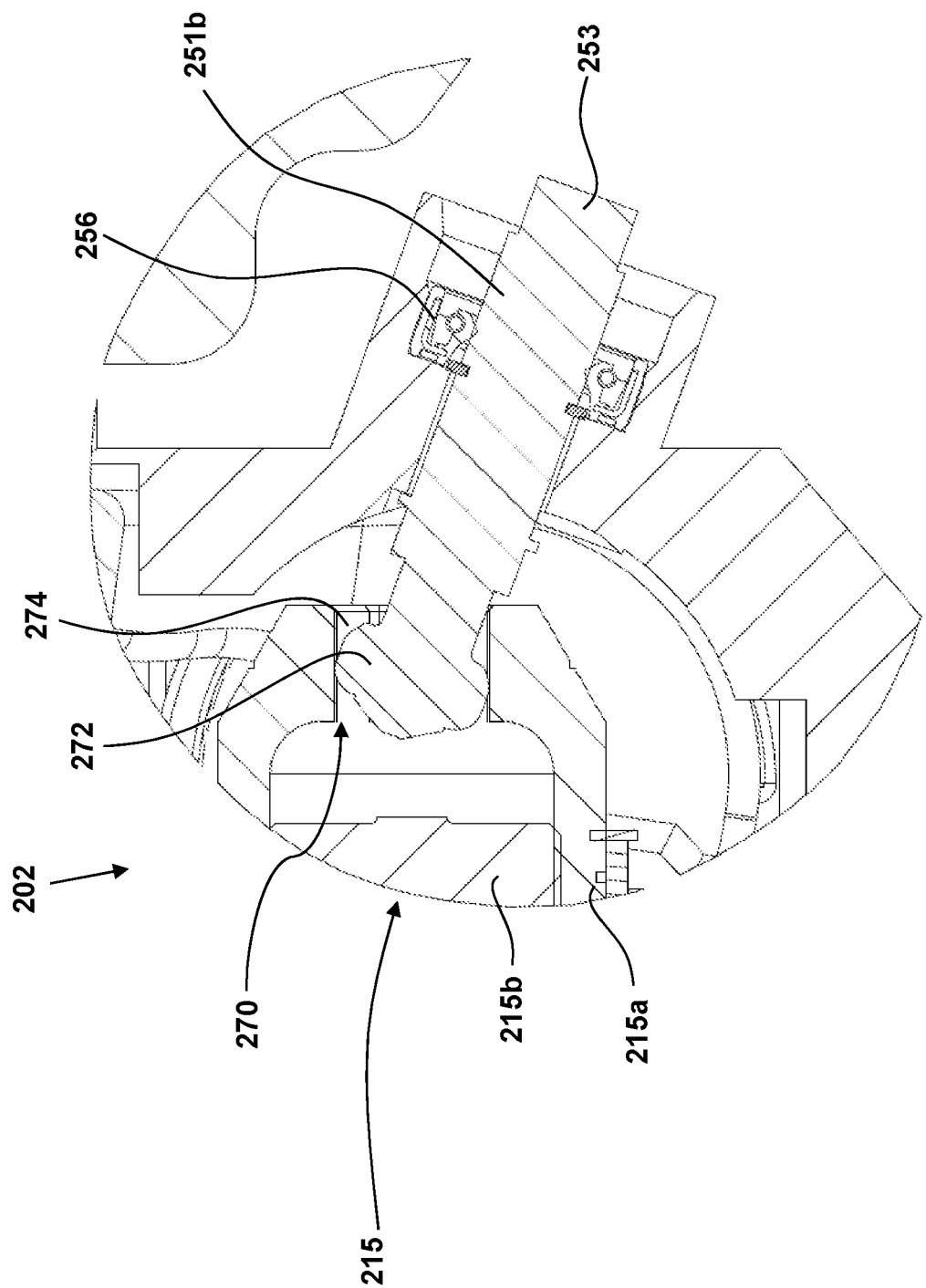
FIG. 5A is an enlarged view similar to FIG. 2A, but of an alternative embodiment.

FIG. 5A illustrates a disc brake 202 incorporating a universal joint 270 according to another embodiment. Like parts are denoted by like numerals as compared to the first embodiment but with the addition of the prefix '2'. FIG. 5A is an enlarged view of the same area of the disc brake as FIG. 2A and only differences between the two are discussed.

In this embodiment, the second element is omitted such that the universal joint 270 is provided by the first element 251b directly meshing with the rotatable, outer portion 215a of the piston 215. This is achieved in this embodiment by providing the ball head 272 on the first element 251b and a non-circular sleeve 274 on the rotatable portion 215a of the piston. The rotatable portion 215a moves axially when the disc brake is applied (of the order of 1-3 mm of movement to take up the running clearance). The first element 251b is fixed axially and so the ball head 272 is able to slide within the non-circular sleeve 274. However, the non-circular sleeve 274 and ball head 272 enable the transmission of drive from a hex head 253 as before. Located outboard of a cover, is a sealing collar 256.

It will be appreciated that numerous changes may be made within the scope of the present invention. For example, the manual adjuster mechanism may be laterally offset from the axis of the piston and the second element may comprise a gear arranged to drive the piston or a sprocket and chain or pulley and belt arrangement. The universal joint may be arranged to permit axial movement between the first and second elements. In other embodiments, more than one universal joint may be utilized.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A disc brake comprising:
   a housing;
   a piston mounted within the housing operable to apply an actuating force to a brake pad, the piston having a rotatable portion to adjust a running clearance between a brake disc and the brake pad and the rotatable portion defining an axis of rotation; and
   a manual adjuster apparatus drivingly connected to the rotatable portion, wherein the manual adjuster apparatus comprises a first element and a universal joint drivingly connecting the first element to the rotatable portion such that the first element extends away from the rotatable portion at an angle that is oblique to the axis of rotation.

2. The disc brake of claim 1 wherein the manual adjuster apparatus further comprises a second element.

3. The disc brake of claim 2 wherein the second element drivingly connects the universal joint to the rotatable portion.

4. The disc brake of claim 3 wherein the second element is in direct driving engagement with the rotatable portion.

5. The disc brake of claim 2 wherein the second element is in substantially parallel alignment with an axis of the rotatable portion.

6. The disc brake of claim 2 wherein the second element is located at least partially within the piston.

7. The disc brake of claim 1 wherein the first element has a head remote from the universal joint.

8. The disc brake of claim 7 wherein the head is accessible from an exterior of the housing to apply torque to the manual adjuster apparatus.

9. The disc brake of claim 8 wherein the head is accessible from an inboard face of the exterior.

10. The disc brake of claim 1 wherein the first element extends at a radially inward angle.

11. The disc brake of claim 1 wherein a wall of the housing is a bearing for the first element and the first element is journaled thereto.

12. The disc brake of claim 11 wherein the bearing is arranged to maintain the angle.

13. The disc brake of claim 1 wherein an interface between the first element and a wall of the housing is arranged to restrict movement of the first element in at least a first axial direction.

14. The disc brake of claim 1 wherein the first element is a rotatable shaft.

15. The disc brake of claim 1 wherein the oblique angle is between 1 and 60 degrees from the axis of rotation of the piston.

16. The disc brake of claim 15 where the oblique angle is between 5 and 45 degrees from the axis of rotation of the piston.

17. The disc brake of claim 1 wherein the universal joint comprises a ball head and sleeve arrangement.

18. The disc brake of claim 1 wherein the universal joint comprises a coiled flexible joint.

19. The disc brake of claim 1 wherein an axis of the manual adjuster apparatus is on substantially a same radial plane as a line of action of a push rod of an actuator of the disc brake.

* * * * *